United States Patent
Choi et al.

(10) Patent No.: US 8,899,261 B2
(45) Date of Patent: Dec. 2, 2014

(54) TRAP APPARATUS FOR CONDENSATE WATER AND DRAIN APPARATUS FOR CONDENSATE WATER INSTALLED ON THE SAME

(71) Applicant: Kiturami Boiler Co., Ltd., Gyeongbuk (KR)

(72) Inventors: Jin-min Choi, Seoul (KR); Dong-ho Lee, Seoul (KR)

(73) Assignee: Kiturami Boiler Co., Ltd., Gyeongbuk (KR)

( * ) Notice: Subject to any disclaimer, the term of this patent is extended or adjusted under 35 U.S.C. 154(b) by 74 days.

(21) Appl. No.: 13/678,761

(22) Filed: Nov. 16, 2012

(65) Prior Publication Data

US 2013/0269915 A1     Oct. 17, 2013

(30) Foreign Application Priority Data

Apr. 17, 2012   (KR) ................. 10-2012-0039687

(51) Int. Cl.
*F16T 1/34*     (2006.01)
*B01D 5/00*     (2006.01)
(52) U.S. Cl.
CPC . *B01D 5/009* (2013.01); *F16T 1/34* (2013.01); *B01D 5/0075* (2013.01)

USPC .......................................... 137/371; 137/314
(58) Field of Classification Search
CPC ............... F24H 9/00; F24H 9/16; F24H 1/14; C02F 1/66; F24D 19/081; B01D 9/005; F25D 21/14; F16T 1/34
USPC .......................... 137/156–161, 171–173, 314
See application file for complete search history.

(56) References Cited

U.S. PATENT DOCUMENTS

| | | | | |
|---|---|---|---|---|
| 2,252,687 | A * | 8/1941 | Bassett | 137/174 |
| 2,680,538 | A * | 6/1954 | Fishburn | 137/172 |
| 2,680,916 | A * | 6/1954 | Smith | 137/516.11 |
| 7,578,932 | B2 * | 8/2009 | Cantolino | 137/268 |
| 8,474,477 | B1 * | 7/2013 | Melisz, Jr. | 137/363 |

FOREIGN PATENT DOCUMENTS

KR         10-0426051  B1     4/2004

* cited by examiner

*Primary Examiner* — Stephen M Hepperle
*Assistant Examiner* — Craig J Price
(74) *Attorney, Agent, or Firm* — Rabin & Berdo, P.C.

(57) ABSTRACT

The present invention relates to a trap apparatus for condensate water and the drain apparatus for condensate water installed on the same. In particular, the present invention relates to a trap apparatus for condensate water, constructed such that acidic condensate water is passed through a neutralizing agent and trapped in the apparatus, and the drain apparatus for condensate water installed on it.

6 Claims, 4 Drawing Sheets

TRAP APPARATUS FOR CONDENSATE WATER AND DRAIN APPARATUS FOR CONDENSATE WATER INSTALLED ON THE SAME

CROSS REFERENCES

Applicant claims foreign priority under Paris Convention and 35 U.S.C. §119 to Korean Patent Application No. 10-2012-39687, filed Apr. 17, 2012, with the Korean Intellectual Property Office, where the entire contents are incorporated herein by reference.

BACKGROUND OF THE INVENTION

1. Field of the Invention

The present invention relates to a trap apparatus for condensate water and the drain apparatus for condensate water installed on the same. In particular, the present invention relates to a trap apparatus for condensate water, constructed such that acidic condensate water is passed through a neutralizing agent and trapped in the apparatus, and the drain apparatus for condensate water installed on it.

Also, the present invention relates to a trap apparatus for condensate water, which adapts an all-in-one drain apparatus to efficiently drain condensate water through drain pipes even at high altitudes, and the drain apparatus for condensate water installed on it.

Furthermore, if a drain apparatus is not used in the present invention, it may easily be disassembled to allow natural draining of condensate water. Thus, the invention relates to a trap apparatus for condensate water and the drain apparatus for condensate water installed on it, which can be used at various locations, regardless of the height the boiler is installed.

2. Description of the Related Art

Generally, a condensing boiler (heat recovery type boiler) is a boiler that is designed to facilitate condensate heat exchange, by keeping the temperature below dew point temperature, and installs a burner on the top or side of the heat exchanger so that combustion gas flows downward.

Said condensing boiler adopts a porous premix method and installs a heat exchanger immediately after the flame surface to control production of nitrogen compounds and emission of carbon monoxide, thus eco-friendly.

Also, by primarily absorbing sensible heat and secondarily absorbing latent heat emitted from exhaust gas, a condensing boiler achieves a high heat recovery rate up to 95% with its exhaust gas at 50° C.~120° C., compared to 150° C.~260° C. for that of general boilers.

However, in a condensing boiler, water vapor in the exhaust gas is emitted after being condensed to below dew point temperature, and because this condensate water is acidic with pH2.8-pH3.5, in case of any contact, it may decay components of the boiler, and will cause pollution if directly drained.

Accordingly, as in FIG. 1, Korean Registered Patent No. 10-426051 disclosed apparatus including a condensate water storage container 20 consisting of a condensate water storage room 21 and condensate water drain 22, a neutralizing case 30 in which a receiver 31, outlet 32, and mesh network 80 is installed, and a tea bag 70 that stores natural materials 50 and a neutralizing agent 40 for basic natural materials 50 which neutralize condensate water.

Yet, in said conventional technology, a condensate water storage room 21 exists, but in the center there is a passageway open to the outlet 32, and around it is the condensate water storage room 21.

Therefore, instead of filling the condensate water storage room 21, most of the condensate water is emitted, thus having poor condensate water trap quality, and accordingly there is high possibility that exhaust gas leaks through the outlet 32 and flows into the room.

Also, when the boiler is installed lower than the surface with a drain pipe, a sump pump (not shown) is used to bring up and release condensate water to the surface. A conventional sump pump, separately attached on the exterior of the boiler, failed to consider the status of the condensate water handling apparatus installed within the boiler, thereby emission lacked efficiency.

BRIEF SUMMARY OF THE INVENTION

In the present invention, a trap apparatus for condensate water, constructed such that acidic condensate water is passed through a neutralizing agent and trapped in the apparatus, and the drain apparatus for condensate water installed on it are proposed in order to resolve the problems stated above.

Also, the present invention attempts to provide a trap apparatus for condensate water, which adapts an all-in-one drain apparatus to efficiently drain condensate water through drain pipes even at high altitudes, and the drain apparatus for condensate water installed on it.

Furthermore, if a drain apparatus is not used in the present invention, it may easily be disassembled to allow natural draining of condensate water. Thus, the invention intends to provide a trap apparatus for condensate water and the drain apparatus for condensate water installed on it, which can be used at various locations, regardless of the height the boiler is installed.

In order to accomplish the object, the trap apparatus for condensate water following the present invention which comprises a condensate water receiver with an inlet for produced condensate water and a outlet for such influx of condensate water to be released; a trap board, installed erect on the bottom surface of said condensate water receiver, trapping condensate water; and a neutralizing agent filled between the trap board and inlet.

In this case, preferably, an influx board, installed on the inlet side of said condensate water receiver and extending from the upper portion towards the lower side, and a bypass board, separated from said influx board and extending upward from a certain height above said condensate water receiver, are further included.

Also, preferably, the lower portion of said influx board is positioned above the upper portion of said bypass board, and the upper portion of said bypass board is positioned above said trap board.

Also, the first overflow prevention guide is installed between said bypass board and the sidewall of said condensate water receiver at the height of the lower portion of said bypass board; the second overflow prevention guide is installed between said bypass board and said trap board at the height of the upper portion of said trap board; preferably, said neutralizing agent fills up to the lower portions of said first overflow prevention guide and second overflow prevention guide.

Furthermore, preferably a plug that blocks or opens the outlet is installed on the outlet of the condensate water receiver.

On the other hand, a drain apparatus for condensate water in the present invention, which is installed on a trap apparatus for condensate water as above, comprises a sump pump, assembled to absorb and forcibly emit condensate water received from the outlet beyond said trap wall but made detachable from said outlet side, a backflow prevention valve installed at the drainage-side of said sump pump, and a drain connected to the drainage-side of the backflow prevention valve.

In this case, a bifurcation tube is connected to the outlet of said condensate water receiver, and preferably said sump pump is connected to said bifurcation tube.

Also, preferably a filter is installed within the interior of the bifurcation tube.

Also, preferably a water level sensors, installed at the outlet of said condensate water receiver and which senses the level of the condensate water that fills the outlet, and a pump controller, receiving input of sensing signal from said water level sensors, are included; said pump controller runs said sump pump if the level of the condensate water is high, while shutting down the sump pump if the level of said condensate water is low.

According to the trap apparatus for condensate water and drain apparatus for condensate water installed on the same, as described in the current invention, it is designed such that when acidic condensate water is passed through neutralizing agent, said condensate water is completely trapped so that exhaust gas leakage through the condensate water outlet is prevented.

Also, the present invention uses an all-in-one drain apparatus within the boiler's interior to sense the level of condensate water, automatically draining condensate water through drain pipes even at high altitudes, thereby enabling efficient draining.

Also, if a drain apparatus is not used in the present invention, it may easily be disassembled to allow natural draining of condensate water, allowing the boiler to be used at various locations, regardless of the height the boiler is installed.

DETAILED DESCRIPTION OF THE INVENTION

Hereinafter, with reference to the attached drawings, preferable embodiments of the trap apparatus for condensate water and drain apparatus for condensate water installed on the same will be described in detail.

Figure 2:
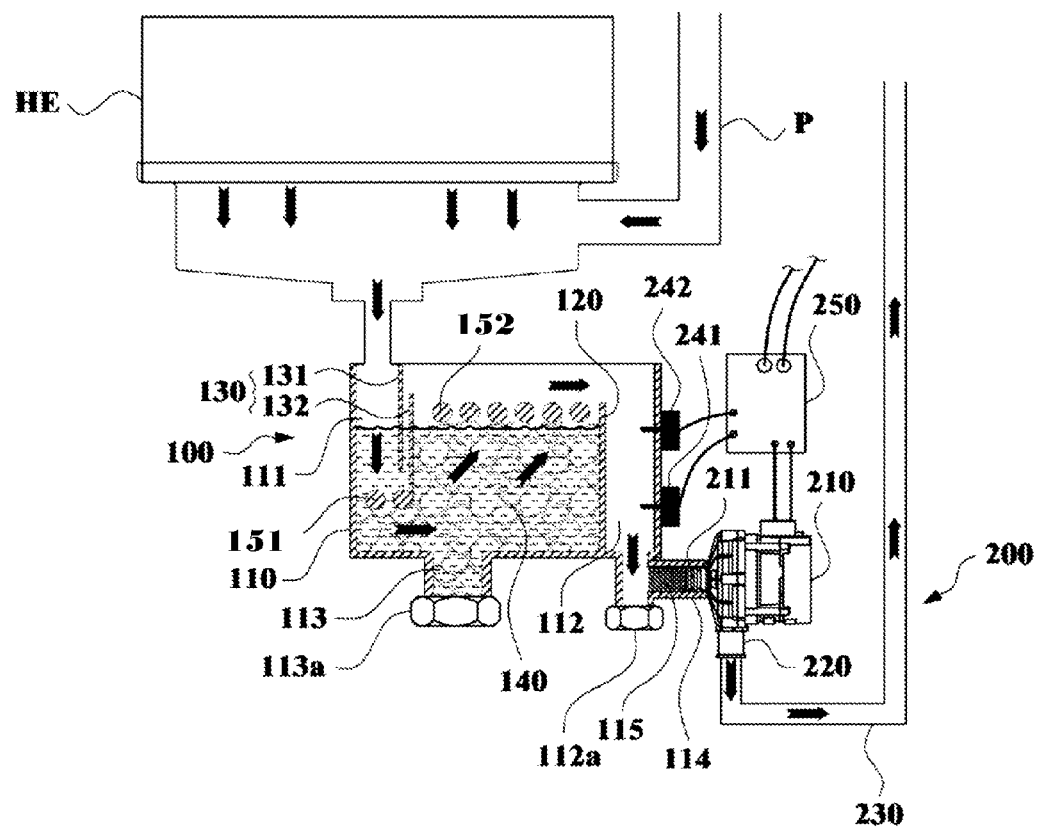
FIG. 2 is the first phase diagram according to a trap apparatus for condensate water and drain apparatus for condensate water installed on the same of the present invention.

As shown in FIG. 2, the trap apparatus for condensate water and drain apparatus for condensate water installed on the same in the present invention at first traps received condensate water, and releases once the water level exceeds a certain point, it is released. In this process, a trap apparatus for condensate water 100 that neutralizes acidic condensate water and a drain apparatus for condensate water 200 that forcibly elevates water drained through the trap apparatus for condensate water 100 to the surface at which the drain pipe (not shown) is formed, are included.

To achieve this, said trap apparatus for condensate water 100 includes a condensate water receiver 110, trap board 120, upper board 130, neutralizing agent 140 and overflow prevention guides 151 and 152, and the drain apparatus for condensate water 200 includes a sump pump 210, backflow prevention valve 220, drain 230, water level sensors 241 and 242 and pump controller 250.

The condensate water receiver 110, temporarily receiving condensate water falling from a condensing heat exchanger (HE) or exhaust port (P), consists an inlet 111 through which condensate water is received on one side and an outlet 112 through which condensate water is emitted on the other side, a structure such that condensate water has to pass through the inlet 111 and outlet 112 in consecutive order in order to be drained.

Also, according to the need, a cleaning pipe 113 connected to the bottom surface of the condensate water receiver 110 and a cleaning hole cap 113a, which blocks or opens opening in the cleaning pipe 113, are included so that the cleaning hole cap 113a may be opened for maintenance procedures such as replacing or cleaning the contaminated neutralizing agent 140.

Also, a plug 112a is assembled at the lower portion of the outlet 112 in the condensate water receiver 110; the plug is used to block, so that condensate water is drained upward through the drain apparatus for condensate water 200 when the drain pipe is at a relatively high altitude, and in reverse, as shown in detail in FIG. 4 below, the plug 112a is removed so that condensate water is naturally drained when the drain pipe is at a relatively low altitude.

Also, a bifurcation tube 114 is connected to the outlet 112 of the condensate water receiver 110, a filter 115 is installed as an insertion in the interior of the bifurcation tube 114, and a sump pump 210 is assembled on the bifurcation tube 114. Therefore, when the sump pump 210 operates, contaminants in the condensate water are purified by the filter 115 and only condensate water is emitted through the sump pump 210.

A trap board 120 is installed erect on the bottom surface of said condensate water receiver 110 to trap condensate water, and when the level of the condensate water filling the condensate water receiver 110 exceeds the height of the concerned trap board 120, such amount of condensate water overflows and is drained through the outlet 112.

Therefore, condensate water is trapped so that condensate water in the condensate water receiver 110 is always maintained at a level lower than the trap board 120, preventing leakage of exhaust gas emitted from the exhaust port(P) through the outlet 112, which may flow into the user's living space.

Figure 1:
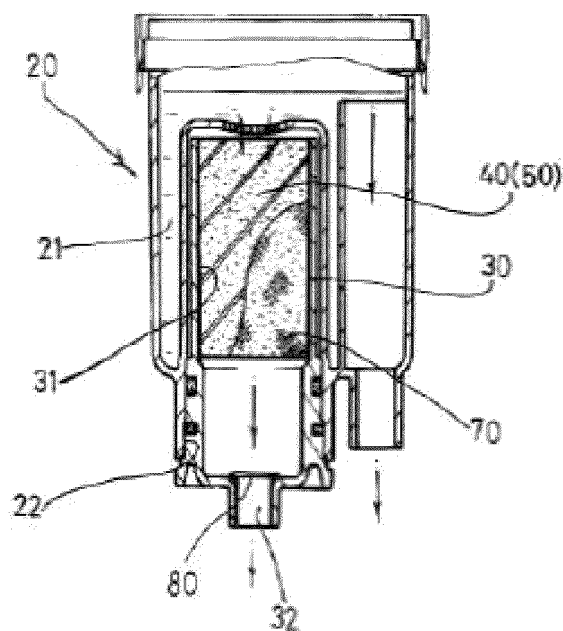
FIG. 1 is a cross-sectional diagram displaying a condensate water processor according to prior art.

Thus, conventionally as in FIG. 1, in the center there is a passageway open to the outlet 32 and around it is the condensate water storage room 21. Exhaust gas is emitted together with condensate water through a neutralizing agent 40 and outlet 32 so the condensate water trap quality is poor and gas may leak into the room afterwards, while as this invention solves this issue.

An upper board 130, installed erect on the upper side (i.e. the inlet side) of the condensate water receiver 110, includes an influx board 131 extending from the upper portion to the lower side, and a bypass board separated from said influx board 131 and extending upward from a certain height above the bottom surface.

Therefore, the flow pathway formed between the influx board 131 and the sidewall of said condensate water receiver 110 is used as said inlet 111, and in case the pore space between the neutralizing agent 140 is blocked due to long-term usage, the flow pathway between the influx board 131 and bypass board 132 can be used as a flow pathway for condensate water to detour and be drained.

Figure 3:
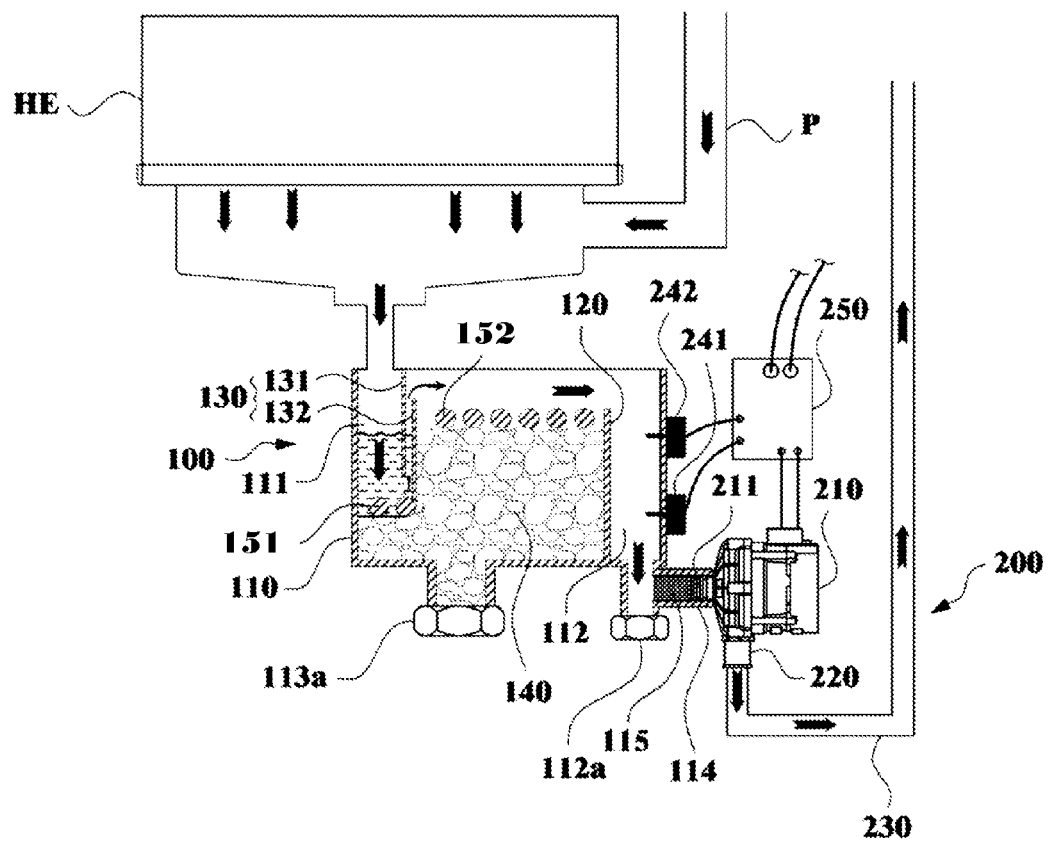
FIG. 3 is the second phase diagram according to a trap apparatus for condensate water and drain apparatus for condensate water installed on the same of the present invention.

Also, each board's position is adjusted so that the lower portion of the influx board 131 is positioned higher than the higher portion of the bypass board 132, and the higher portion of the bypass board 132 is positioned higher than the higher portion of the trap board 120, in order to ease the influx of condensate water through the pathway between the influx board 131 and bypass board 132 as in FIG. 3, and the draining of condensate water overflowing above the bypass board 132 through the outlet 112 side, using the difference in water level.

Therefore, even in case the neutralizing agent 140 is blocked due to long-term usage, condensate water overflows and flows back into the condensing heat exchanger (HE) or exhaust pore (P), preventing contact, so that components are not damaged due to corrosion of the condensing heat exchanger (HE) or exhaust pore (P) by the acidic condensate water.

A neutralizing agent 140 prevents from causing pollution during draining by neutralizing acidic condensate water. Various neutralizing agents 140, such as chemically synthesized neutralizing agents or natural neutralizing agents may be used, but preferably natural neutralizing agents are used.

Known natural neutralizing agents include natural basic minerals, natural shells, natural coral, and egg shells, and those that may be used as natural neutralizing agent from said natural basic minerals include marble, calcite, berth, limestone, Iceland spar, and dolomite.

An overflow prevention guides 151 and 152 prevents the neutralizing agent 14 filling the condensate water receiver 110 from overflowing due to the buoyant force of the condensate water, neutralizes the acidic condensate water or fixes the neutralizing agent 14 so that condensate water is constantly positioned on the drain route, and includes the first overflow prevention guide 151 and second overflow prevention guide 152.

In this case, the first overflow prevention guide 151 is installed between the bypass board 132 and sidewall of the condensate water receiver 110, but positioned at the height of the lower portion of the bypass board 132 (i.e. lower portion of the inlet), and the second overflow prevention guide 152 is installed between the bypass board 132 and trap board 120, but positioned at the height of the lower portion of the trap board 120.

The first overflow prevention guide 151 and second overflow prevention guide 152 allows flow of condensate water, but does not allow flow of the neutralizing agent 140. One example is pressure poles placed with regular intervals, and in such pressure pole format, a neutralizing agent 140 fills up and is fixed in the lower portion of each the first overflow prevention guide 151 and second overflow prevention guide 152.

When the boiler is installed lower than the drain, the sump pump 210 is used to bring up and release neutralized condensate water through the drain to the surface where said drain is positioned, preferably equipped all-in-one within the boiler's body.

Such sump pump 210 is connected to the bifurcation tube 114 through a connection hole 211, and in this case said filter 115 is installed within the bifurcation tube 114 so that various suspended solids or pollutants in the condensate water are filtered out and sucked up by the sump pump 210, thus preventing damage in the drain apparatus for condensate water 200 including the corresponding sump pump 210.

The backflow prevention valve 220 prevents condensate water backflow towards the sump pump 210 while the sump pump 210 brings up the condensate water to the drain at a high position, in which representatively a check valve may be used, but various other valves may also be used without restriction if they are able to prevent backflow of condensate water.

The drain 230 guides condensate water released from the sump pump 210 to the drain pipe, the first unit is connected to the output unit of the sump pump 21 through a backflow prevention valve 220 and another unit is extended to approach the drain pipe.

The water level sensors 241 and 242 sense the water level of the condensate water filling the outlet 112 to transfer to the pump controller 250. In FIG. 2, it is exemplified with the two water level sensors 241 and 242, a low water level sensor 241 installed at the lower portion of the outlet 112 and a high water level sensor 242 installed at the higher portion of the outlet 112.

However, in order to sense the water level of condensate water more precisely, more water level sensors may be installed for each level of the outlet 112, and it is clear that sensors of various types of sensors, such as capacitive sensors, rod type water level sensors, and flow-type sensors, may be used.

The pump controller 250 receives input of sensing signal of the level of the condensate water from the water level sensors 241 and 242, controlling the operation of the sump pump 210.

For example, when condensate water is filled up to the height the high water level sensor 242 is installed and the high water level sensor 242 transmits a sensing signal, the pump controller 250 operates the sump pump 210 to release condensate water.

On the other hand, when condensate water is drained to the point below the low water level sensor 241 and the low water level sensor 241 transmits a sensing signal, the pump controller 250 stops the sump pump 210.

Therefore, the present invention uses a sump pump 210 installed all-in-one within the boiler's body and the water level sensors 241 and 242 to efficiently drain condensate water according to condensate water processing condition.

Hereinafter, the first phase of the present invention, constructed in the format above, is explained according to FIG. 2.

First, when exhaust gas falls below the dew point temperature through heat exchange, acidic condensate water is produced in the condensing heat exchanger (HE) or exhaust pore (P), and condensate water is collected through the inlet 111 into the condensate water receiver 110.

When condensate water begins to be collected and the level of the condensate water exceeds the higher portion of the trap board 120, condensate water exceeds the trap board 120 and is drained through the outlet 112. In that process, acidic condensate water is neutralized by a neutralizing agent 140.

Meanwhile, when neutralized condensate water begins to fill up the outlet 112 and the water level exceeds the position where the water level sensor 242 is installed, the high water level sensor 242 delivers a sensing signal to the pump controller 250, and the sump pump 210 emits condensate water under control of the pump controller 250.

Next, when a certain amount of time has passed and the level of the condensate water filling the outlet 112 has lowered, the low water level sensor 241 transmits a operation stop signal to the pump controller 250 and the sump pump 210 is stopped under control of the pump controller 250.

Hereinafter, the second phase of the present invention, constructed in the format above, is explained according to FIG. 3.

As explained above according to FIG. 2, acidic condensate water, produced while the boiler is in use, is neutralized with a neutralizing agent 140, and if this processing procedure is continued for a long time, due to issues such as blockage of the pore space between the neutralizing agent 140 condensate water can no longer pass through the neutralizing agent 140.

In this case, if the boiler is continuously run and acidic condensate water is continuously produced as well, since it is not passed through the neutralizing agent 140, condensate water fills up the condensate water receiver 110 and overflows into the condensing heat exchanger (HE) or exhaust pore (P) and the condensing heat exchanger (HE) or exhaust pore (P) in contact with the acidic condensate water decays.

However, in the present invention, a flow path is formed between the influx board 131 and bypass board 132, and at the same time the second overflow prevention guide 152 is connected to the lower portion of the bypass board 132, thus the neutralizing agent 140 does not block the flow path between the influx board 131 and bypass board 132.

Therefore, when condensate water is filled up to the level exceeding the higher portion of the bypass board 132, condensate water received through the flow path between the influx board 131 and bypass board 132 is drained beyond the bypass board 132 through the outlet 112.

Next, when condensate water fills the outlet 112, the high water level sensor 242 and low water level sensor 241 senses this, and sends a sensing signal to the pump controller 250, the pump controller 250 controlling the operation of the sump pump 210 as explained above.

Hereinafter, the third phase of the present invention, constructed in the format above, is explained according to FIG. 4.

In FIG. 2 and FIG. 3 explained above, since the boiler is installed lower than the drain pipe, a drain apparatus for condensate water 200 that carries condensate water to high positions is required, but on the contrary, if the boiler is installed higher than the drain pipe, drain apparatus for condensate water 200 is not needed.

Figure 4:
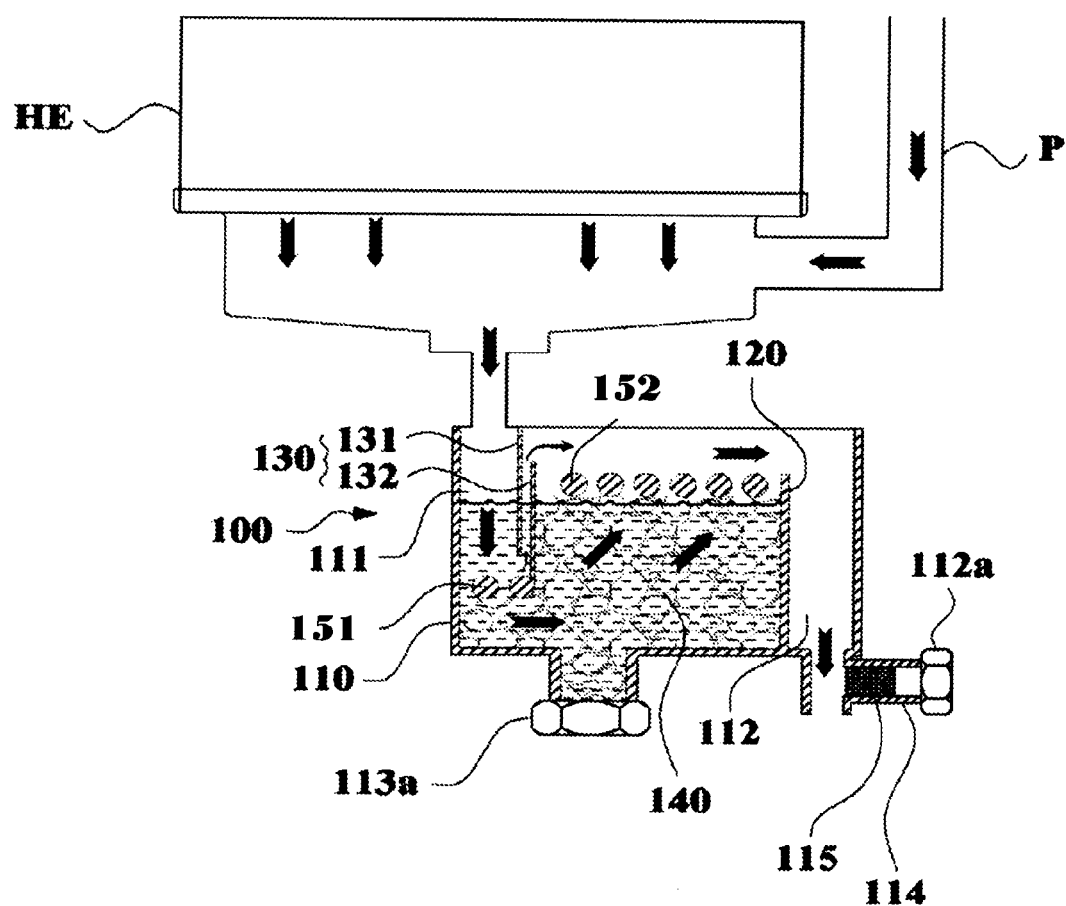
FIG. 4 is the third phase diagram according to a trap apparatus for condensate water and drain apparatus for condensate water installed on the same of the present invention.

Thus, in this case as in FIG. 4, drain apparatus for condensate water 200 connected to the drainage side of the trap apparatus for condensate water 100 is separated from the boiler's body, or though not shown, there is need to separate the drain apparatus for condensate water 200 from the trap apparatus for condensate water 100 by simply picking out the sump pump 220 from the bifurcation tube 114, and keeping it within the boiler's body.

In order to do this in the present invention, the drain apparatus for condensate water 200 connected to the trap apparatus for condensate water 100 is separated, and the plug 112a that used to block the outlet 112 of the condensate water receiver 110 is removed.

Also, as the drain apparatus for condensate water 200 is separated, the opened bifurcation tube 114 blocks with a means of blocking. Said plug 112a may be used as the means of blocking. In other words, the plug 112a separated from the outlet 112 is used to block the bifurcation tube 114.

As said, if the bifurcation tube 114 is blocked and the outlet 112 is open, condensate water that exceeds the condensate water receiver 110 and flows into the outlet 112 is naturally drained through the lower portion of the opened outlet 112, thus even when the boiler is installed higher than the boiler's drain opening the trap apparatus for condensate water 100 in the present invention can be used.

In conclusion, the embodiments of the present invention have been described. However, those skilled in the art will appreciate that the spirit and scope of the present invention are not limited to the specific embodiments, but various modifications and transformations are possible, without departing from the essence of the invention.

Therefore, the described preferred embodiments are provided to illustrate the scope of the invention to those skilled in the art, are foreshadowing in all aspects and must be understood as not being limiting. The scope of the present invention will be defined in the accompanying claims.

What is claimed is:

1. A trap apparatus for condensate water, comprising:
a condensate water receiver having an inlet introducing condensate water and an outlet discharging the condensate water;
a trap board installed on a bottom surface of said condensate water receiver adjacent to the outlet and extending upward, the trap board trapping said condensate water;
an influx board installed on an upper surface of the condensate water receiver adjacent to the inlet and extending downward;
a bypass board installed side by side with the influx board and extending upward from a certain height above the bottom surface of the condensate water receiver, wherein a lower end of the influx board is positioned higher than a lower end of the bypass board, and an upper end of the bypass board is positioned higher than an upper end of the trap board;
a first overflow prevention guide disposed between said bypass board and a sidewall of said condensate water receiver at a height of the lower end of said bypass board;
a second overflow prevention guide disposed between said bypass board and said trap board at a height of the upper end of said trap board; and
a neutralizing agent filling said condensate water receiver up to lower portions of said first overflow prevention guide and said second overflow prevention guide.

2. The trap apparatus for condensate water in claim 1, further comprising:
a plug for closing the outlet of said condensate water receiver.

3. The drain apparatus for condensate water installed on said trap apparatus for condensate water in claim 1, which comprises
a sump pump pumping the condensate water out of the outlet;
a check valve installed at an outlet of the sump pump; and
a drain connected to the check valve.

4. The drain apparatus for condensate water in claim 3, further comprising:
a bifurcation tube connected to the outlet of said condensate water receiver, wherein the sump pump is connected to said bifurcation tube.

5. The drain apparatus for condensate water in claim 4, further comprising;
a filter disposed inside the bifurcation tube.

6. The drain apparatus for condensate water in claim 3, further comprising:
water level sensors installed in the outlet of said condensate water receiver and sensing a level of the condensate water in the outlet; and
a pump controller controlling the sump pump according to the level sensed by said water level sensors.

* * * * *